W. Gardiner

Sawing Mach.

N° 90,043.    Patented May 11, 1869.

Witnesses;
E. P. Mau
Jas. A. Griffith

Inventor;
Wm Gardner
per Thos. A. Connolly
Attorney.

United States Patent Office.

WILLIAM GARDINER, OF STONEBOROUGH, PENNSYLVANIA.

Letters Patent No. 90,043, dated May 11, 1869.

IMPROVEMENT IN SAWING-MACHINES.

The Schedule referred to in these Letters Patent and making part of the same.

*To all whom it may concern:*

Be it known that I, WILLIAM GARDINER, of Stoneborough, in the county of Mercer, and State of Pennsylvania, have invented certain new and useful Improvements in Crosscut-Sawing Machines; and I do hereby declare the following to be a full, clear, and exact description thereof, reference being had to the accompanying drawings, and to the letters of reference marked thereon.

The nature of my invention relates to the elevation and descent of the saw, independent of the sill, to which the ordinary reciprocal saw-motion is given by means of suitable gearing and pitmen arranged in the main frame behind the sill and operated by hand. (See figs. 1 and 3.)

In the accompanying drawings—

Figure 1:
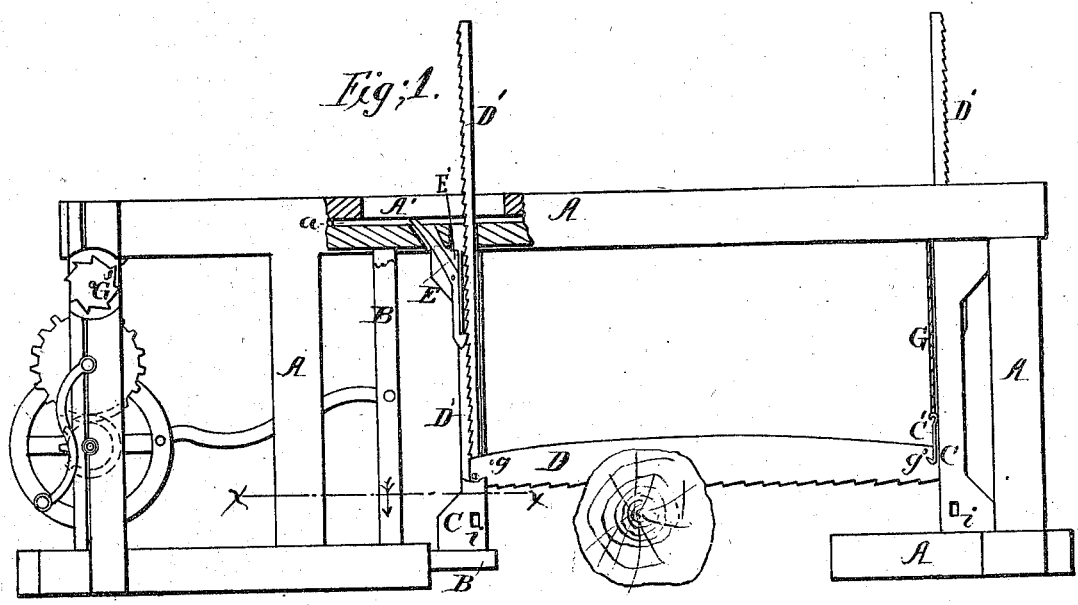

Figure 1 is a side elevation of said machine, showing general form and arrangement of parts.

Figure 2:

Figure 2, view of under side of top bar of main frame.

Figure 3:
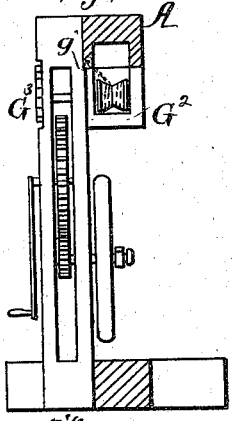

Figure 3, view of rear end of main frame, containing before-mentioned gearing, and portion of device for raising the saw.

Figure 4:
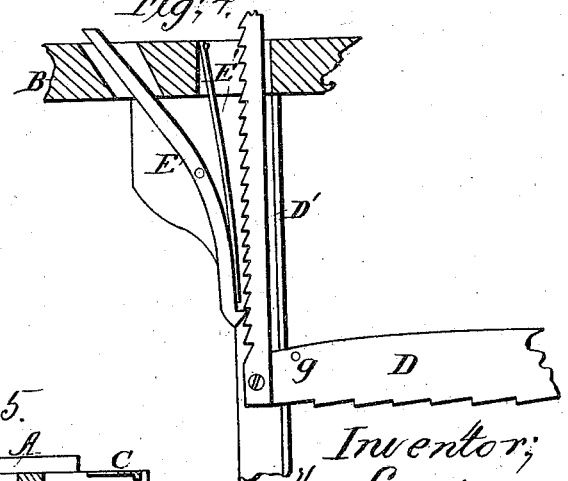

Figure 4, view of ratchet-bar and spring-pawl for holding saw in place and allowing it to descend.

Figure 5:

Figure 5, section of sill and main frame on line $x\ x$ of fig. 1.

A is the rectangular main frame, with double upright supports.

B is the saw-sill, sliding in suitable grooves in the main frame.

C are double separated cross-bars of sill. (See fig. 5.)

D is the saw, to each end of which are attached, by bolts or otherwise, the upright ratchet-bars D'.

The saw is placed in the sill by inserting the ratchet-bars in the openings below the cross-pieces C and arranged at any desired height therein, the sill and main frame having slots at the top for the ratchet-bars to pass through.

The slots A', for that purpose, in the main frame, are large enough to allow the ratchet-bars to move forward and backward with the sill.

E are pawls or levers, to hold ratchet-bars, pivoted between the cross-bars C, as seen in figs. 1 and 4, near the upper end thereof.

The upper ends of said levers curving backward slightly, pass through slots in the top bar of sill, and extend a little above it, a groove, $a$, being made in the top bar of main frame, through which the ends of the levers pass, when the sill is moved.

E' are springs, to hold lower ends of said levers pressed against the ratchet-bars.

G are cords, provided with hooks, $G^1$, hanging down at the ends of the saw, to which they are attached, by inserting in the holes $g$, when the saw is to be raised.

The cords pass over pulleys $g^2$ in the top bar of main frame, (see fig. 2,) and are wound on a suitable block, $G^2$, in a bracket at the rear end of main frame A, (see figs. 2 and 3,) operated by the wheel $G^3$, or equivalent.

The saw-sill and main frame are partly open at the bottom, to admit the log to be sawed.

When the machine is in operation, the upper ends of the levers E, coming in contact with the closed ends of the groove $a$, disengage the lower ends from the ratchet-bars, which are allowed to descend alternately the distance of one or more of the teeth, by which time the levers, by means of the springs E', again engage with the ratchet-bar, and so on until the log is sawed.

The saw may be then raised for another cut by winding the cords G.

$i\ i$ are holes in the lower ends of the uprights C, so that, by the use of a proper tool, the saw may be removed from the ratchet-bars.

What I claim as my invention, and desire to secure by Letters Patent, is—

In combination with the frame A and sill B, provided with suitable gearing and pitmen, the saw D and spring-pawls E, when all the parts are constructed and arranged to operate substantially as and for the purpose set forth.

WILLIAM GARDINER.

Witnesses:
A. S. THROOP,
S. B. THROOP.